Feb. 9, 1971 D. O. KINGSLAND 3,561,846

RADIATION SENSITIVE SCANNER FOR DOCUMENTS

Filed Jan. 31, 1969 3 Sheets-Sheet 1

INVENTOR.
DAVID O. KINGSLAND
BY [signature]
ATTORNEY

United States Patent Office 3,561,846

Patented Feb. 9, 1971

3,561,846

RADIATION SENSITIVE SCANNER FOR DOCUMENTS

David O. Kingsland, Fairport, N.Y., assignor to Xerox Corporation, Rochester, N.Y., a corporation of New York Filed Jan. 31, 1969, Ser. No. 795,510
Int. Cl. G06k 9/00
U.S. Cl. 250—219 12 Claims

ABSTRACT OF THE DISCLOSURE

Apparatus for scanning documents in fascimile machines and the like having a light source, elliptical reflector, means to accumulate and focus reflected light contained within the reflector and means for generating an electrical signal in response to the reflected light.

BACKGROUND OF THE INVENTION

This invention relates to facsimile scanners and, more particularly, to scanners of the type wherein a moving document is scanned by a light source and reflected light from the document is converted into electrical signals and transmitted to a remote location to produce a facsimile of the original document.

In facsimile systems such as those employing telephone lines to transmit electrical signals from a transmitter to a receiver, a document is scanned by a light source and light reflected from the document is accumulated and exposed onto a photosensor device which generates transmittable electrical signals in response to the amount of light it receives. During the scanning operation, the document being scanned can be placed on a rotating drum which continually conveys successive portions of the document adjacent the scanner while the scanner moves across the length of the drum scanning the entire document. The document can be placed on the outside of the drum and scanned by a scanner located adjacent the drum, or it can be placed on the inside surface of a hollow drum or curved section thereof and scanned by a scanner located within the drum.

To facilitate easy operation of the facsimile system, the document should be easily placed on and removed from the drum and, in this regard, only the leading edge of the document usually is fastened to the drum by a retainer arrangement. Although such a fastener device affords easy loading and removal of documents from the document drum, the document, due to its natural rigidity, often becomes bowed near the retainer causing its leading portion to be displaced away from the drum surface due to the compressive action of the retainer. As a result of the leading portion of the document being displaced from the drum and all other portions of the document being positioned flatly against the drum surface, the document will appear to have irregularities to it as it is conveyed by the drum. Since the scanner normally remains at a fixed distance from the document and the scanning spot it produces is focused at a fixed point, usually on the surface of the document when it is located flatly on the surface of the drum, any irregularity of the document in the vicinity of the retainer is going to make that portion of the document out of focus thereby causing the quality of the information being scanned to be distorted. This problem can be alleviated by increasing the working depth of the scanner so that the irregular portion of the document as well as the portion that is positioned flatly on the drum is maintained within the focus of the scanner. The invention herein discloses a unique manner by which the working depth of the scanner is increased to include reliable scanning of the irregular portion of the document.

Presently known scanners include those which illuminate a document from a first angle and accumulate and focus light reflected from the document being scanned at a second angle. In this type of scanning apparatus the illuminator and accumulator must necessarily be separated from one another since the path of light reflected from the document is not coincident with the path of the light illuminating the document. In addition to occupying a large amount of space adjacent the document drum, there can be a problem in maintaining the illuminator and accumulator portions of the scanner in proper alignment relative to one another because of their spaced positions. The scanner disclosed herein includes a reflector, lamp, light accumulator and focus, and photosensor combined in a novel manner so that all of these elements are contained within the reflector unit resulting in a compact, easily aligned, scanner.

Therefore, it is an object of the invention to provide an improved scanner for facsimile systems.

It is another objcet of the invention to improve a facsimile scanner by increasing the allowable amount of displacement between the document drum and document while maintaining a reliable scanning system.

It is another object of the invention to provide an improved scanner which has a sufficiently large working depth to reliably generate electrical signals in response to the light reflected from the document being scanned when the document contains irregularities and all portions of it do not lie flatly on the document drum.

It is still another object of the invention to improve the working depth of a facsimile scanner by placing the light source at one focus of an elliptical reflector and orienting the filament of the light source concentrically about the major axis of the elliptical reflector.

It is a further object of the invention to improve a facsimile scanner by positioning the light source, means to accumulate and focus light, and photosensor within an elliptical reflector concentrically with the major axis of the elliptical reflector.

It is a further object of the invention to provide a compact scanner.

SUMMARY

The present invention includes a facsimile scanner having the document being scanned located at one focus of an elliptical reflector and a light source located at the other focus of the reflector with its filament concentric with the major axis of the reflector. A light accumulator and photosensor are located inside the reflector between its two foci, these elements also being positioned concentrically with the major axis of the reflector.

BRIEF DESCRIPTION OF THE DRAWINGS

For a better understanding of the invention as well as other objects and further features thereof, reference is had to the following detailed description of the invention to be read in connection with the accompanying drawings, wherein.

DESCRIPTION OF THE PREFERRED EMBODIMENTS

Figure 1:
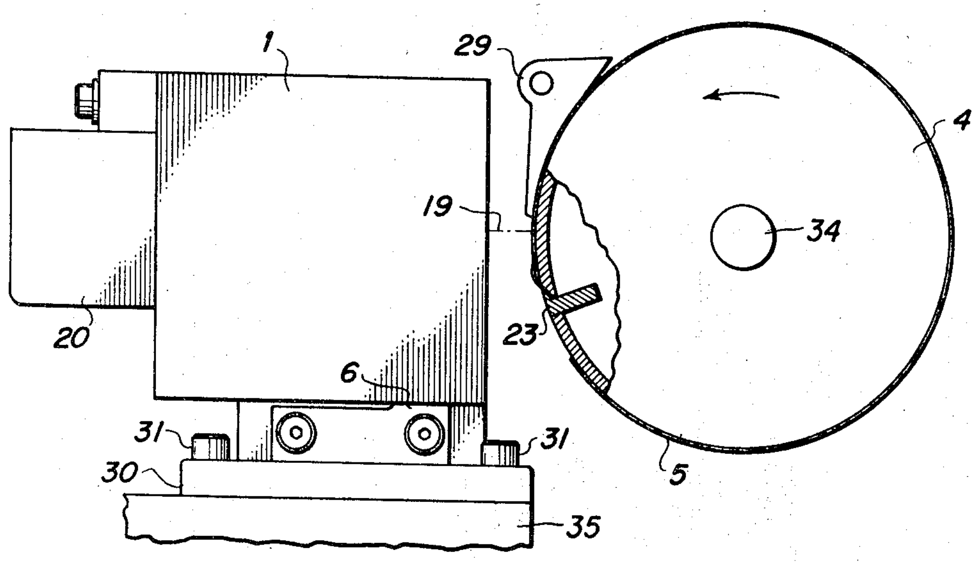
FIG. 1 is an elevation view of one side of the scanner and document carrier.

The scanner illustrated in FIG. 1 is shown in the environment of a facsimile transmitter and includes a reflector 1 having a lamp housing 20 attached thereto and an internal assembly (hidden in this view) supported therein by arm 6. The base 30, which is an integral part of the scanner, is supported on a carriage 35 (not fully shown) or other suitable chassis by fasteners 31. The carriage provides for movement of the scanner in a direction parallel to the axis 34 of a document drum 4, while constantly positioning the scanner adjacent the document drum. Drum 4 supports and rotates document 5 while the information on the document is being scanned. The leading edge of document 5 is secured to the document drum 4 by a retainer clip 23 and, as the drum carries successive portions of the document adjacent the scanner, finger 29 urges the document flat against the surface of the drum. The information on the document is completely scanned by the scanner as the document drum rotates and the scanner is moved across the document parallel to the axis of the document drum. The other elements of a facsimile transmitter which complete the facsimile system are not shown in the figures since they are well known in the art and the invention herein lies within the scanner.

Figure 2:
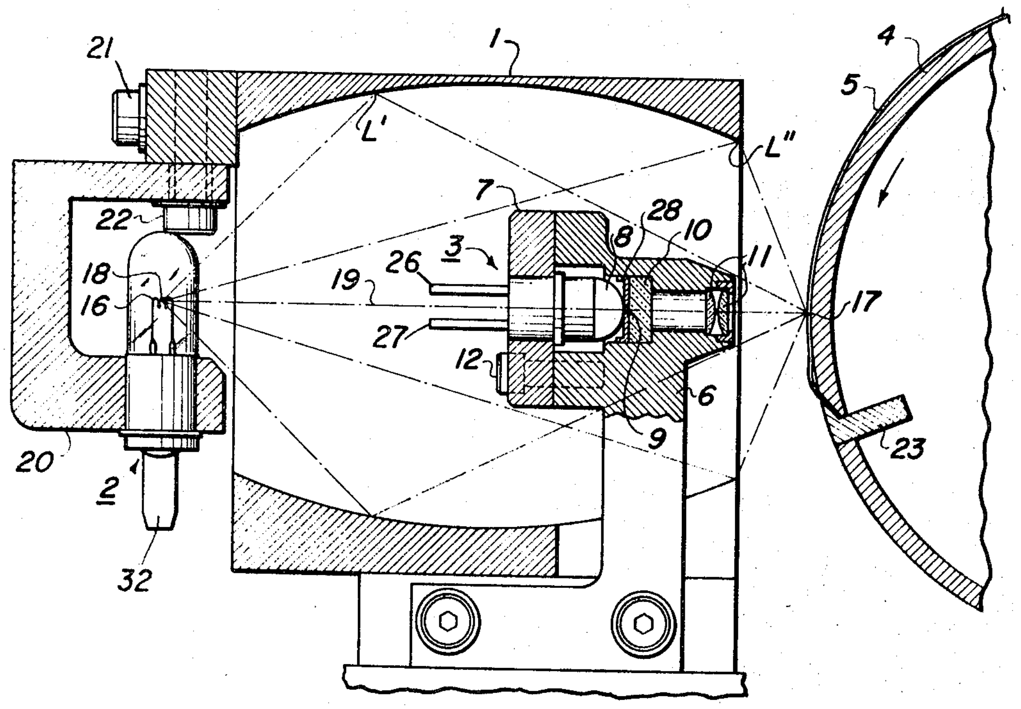
FIG. 2 is a sectional view of the scanner showing its lamp and internal assembly.

FIG. 2 is a sectional view of the scanner and document drum 4 showing the position of the lamp 2 and the various elements of the internal assembly 3 which is supported within the reflector. The scanner is placed adjacent the document drum 4 which carries document 5 while the document is being scanned. The document drum 4 rotates in the counterclockwise direction as shown by the arrow permitting successive portions of the document to rotate past the scanner. Lamp 2, in combination with elliptical reflector 1, illuminates an incremental portion of the document adjacent the internal assembly, and, depending on the degree of opaqueness of the document at the point it is being illuminated, a quantity of light rays will be reflected by the document into the internal assembly. The internal assembly includes means to accumulate and focus light reflected into it which is subsequently converted to an electrical signal and transmitted to a receiver.

The inside surface of the reflector 1 is a partial ellipsoid having a first focus 17, a second focus 18, and a major axis 19 running through the two foci. In FIG. 2, the reflector is truncated at both ends so that the lamp can be placed at the second focus of the reflector and the scanner can be brought adjacent the document in the vicinity of the first focus The internal assembly 3 is positioned along the major axis 19 of the reflector and contained within the reflector.

The lamp 2 is housed within lamp housing 20 which is attached to the reflector by fastener 21. The lamp is of the ordinary filament type, such as an elongated coiled filament shown in the figures, connected electrically to a suitable power source (not shown) through terminal 32. The filament 16 of the lamp is placed at the second focus 18 and during the operation of the scanner, is imaged at the first focus 17 of the reflector due to the reflecting characteristics of the reflector. The position of the lamp can be adjusted up and down relative to the reflector by adjustment screw 22 and, in this manner, the filament can be easily aligned with the second focus during installation of the scanner. Because of the position of the internal assembly 3 within the reflector, only a portion of the illumination generated oy lamp 2 which reaches the reflector will be reflected to the first focus 17. For example, referring to FIG. 2, the rays that reach the first focus are reflected between points L′ and L″ which are indicated on the upper section of the reflector. (L′ and L″ are only indicative of a focus of points around the reflector.) The rays of light reflected by portions of the reflector that do not lie between these points are blocked by the internal assembly from reaching the first focus. The actual amount of illumination blocked by the internal assembly shown in FIG. 2, it has been found, is not in excess of 20% of the total illumination which would be reflected by the reflector if the internal assembly were not present within the reflector, and this loss is of little consequence in the operation of the scanner.

The internal assembly 3, as shown in FIG. 2, includes a photosensor 8, an aperture plate 28 having an aperture 9, a light filter 10, and a lens system 11, all housed within frame 6. The photosensor can be any suitable means which is capable of generating an electrical signal in response to the amount of light received by it such as a phototransducer. An example of a photosensor which has been utilized within the scanner is the FPT–100 phototransistor made by Fairchild Semiconductor Company, Mountain View, Calif. The photosensor is positioned within frame 6 and secured to the frame by retaining plate 7 and fastener 12. The electrical signals produced by the photosensor are carried from it by electrical leads 26 and 27 to any convenient point (not shown) in the facsimile system for transmission.

An aperture plate 28 is positioned adjacent the photosensor between the photosensor and document drum. The aperture plate contains a small aperture which is of a size preferably in the vicinity of the size of that portion of the document that is being scanned. Adjacent the aperture plate 28 is a light filter 10 which is an optional feature within the internal assembly. The filter is desirable when information on the document 5 appears in a color other than black. The photosensor does not distinguish between colors reflected to it, but instead, it distinguishes degrees of light reflected to it. Therefore, the purpose of the filter is to tailor the photosensor's response in such a manner as to become phototropic in nature; i.e., having the same color response as the human eye. Any suitable light filter can be used in the system such as the one shown in FIG. 2 which is blue-green glass #9780 made by Corning Glass Works in Corning, N.Y. In the alternative, the filter can be chosen so that the system is made selective by using a number of discrimination filters which cause the photosensor to generate a signal in response to information of one color on the document. If the document being scanned has information on it only in black, the filter would not be necessary.

The last element in the frame of the internal assembly is lens system 11 which is located between the aperture plate 28 and filter, if one is used, and document 5. The purpose of the lens system is to focus the image reflected from the document onto the photosensor 8 so that sharp, clear, accurate electrical signals are generated by the photosensor. The optical system shown in a one-to-one system and, therefore, the lens system is located midway between the document and the photosensor. Any other magnification having an overall optical conjugate which fits between the photosensor and document could also be used.

The various elements of the internal assembly described above are securely mounted in alignment with one another within the frame 6 and the frame, in turn, is supported within the reflector by arm 13 which is secured to the reflector by fasteners 14 and 15. The arm 13 positions the frame 6 in such a manner that the photosensor, aperture, filter, and lens system are all located concentrically about the major axis 19 of the reflector 1. When a document passes through the first focus 17 during scanning, part of the light reflected by the portion of the document being scanned passes through the lens system, filter and aperture and is imaged on the photosensor. The photosensor generates an electrical signal in response to the amount of light it receives which is thereafter transmitted to a receiver in any of many ways known. If the portion of the document being scanned is white and has no information on it, a large portion of the light rays striking the document will be reflected to the photosensor and the photosensor will generate a particular signal in response thereto. If, on the other hand, the portion of the document being scanned bears information, a portion or all of the light rays striking it will be absorbed by the document and the reminder, if any, will be reflected to the photosensor. In this second case, the light rays reflected to the photosensor will be less than received by it when no information appeared on the document and, correspondingly, the photosensor will produce a different signal or if desired, no signal in response thereto. If the information on the document contains various scales of gray, a photosensor can be adapted to distinguish between the various grays by producing a different signal in response to the quantity of light reflected to the photosensor which will depend, in turn, on the opaqueness of the information being scanned.

In a fascimile system where the document 5 being scanned is placed on a conveyor such as drum 4 and the leading edge of the document is secured to the drum surface by an arrangement such as retainer clip 23 as shown in FIG. 2, a problem is generally encountered in keeping the portion of the document near the clip flat against the drum surface. As shown in greater detail in FIG. 3, due to the natural rigidity of the document, it will not necessarily lie flat on the drum surface because of the compressing action of the clip. As a result, the portion of the document in the vicinity of the clip will pass through a path that is closer to the scanner than the rest of the document.

Figure 3:
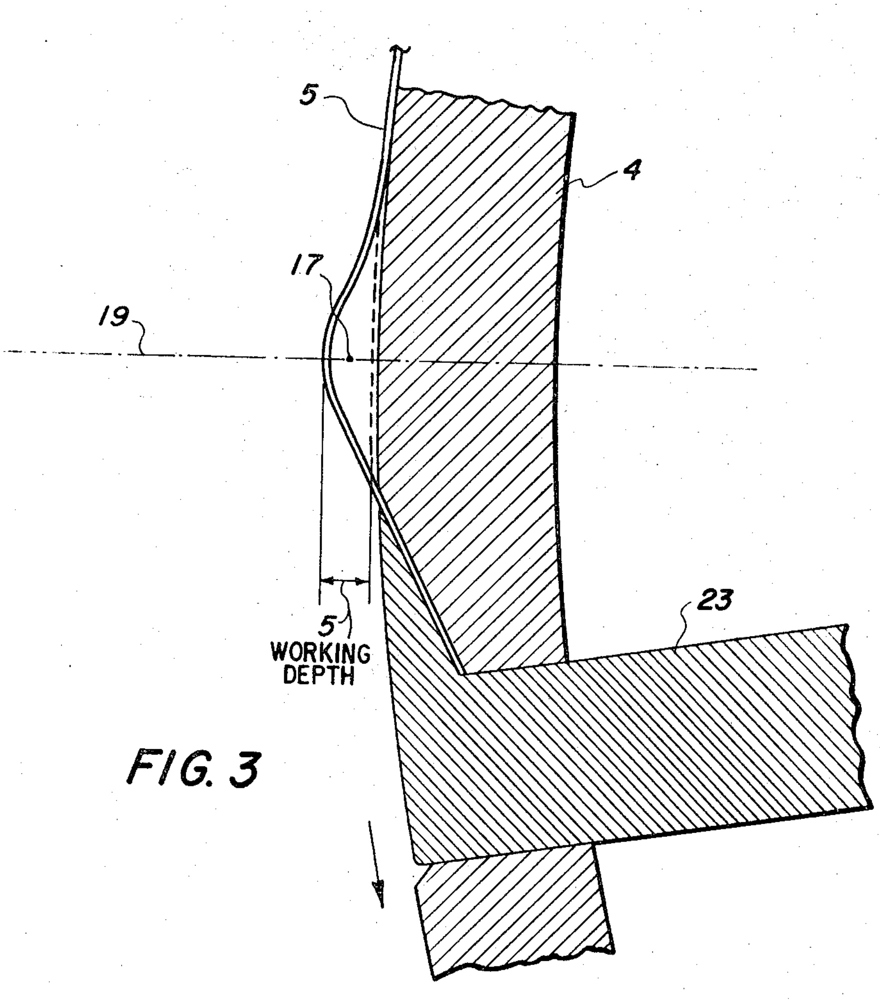
FIG. 3 is an enlarged view of the document and document drum in the vicinity of the location where the document is being scanned.

The scanner, in order to accommodate this displacement of the document, preferably has a working depth sufficient to encompass the displacement of the document. The working depth is the total displacement that can be tolerated about the first focus 17 by the document without significantly depreciating the quality of the signal generated by the photosensor. In this regard, the orientation of the filament 16 of lamp 2 is of great importance. It has been found that the working depth for scanning is increased if the lamp filament is oriented so that equal portions of it are positioned on both sides of the second focus 18 and its length is aligned concentrically with the major axis 19 of the reflector. By locating the filament in this manner, the image of the filament will provide a three dimensional intensity distribution centered on focus 17 which creates a significant elongation of focused light in a direction perpendicular to the surface of the document 5 thereby optimizing the working depth of the scanner. To take full advantage of the working depth of the scanner shown in FIG. 2 the outer limit of the working depth should fall coincident with the information bearing surface of the document when the document lies flatly on the document conveyor. (This is indicated by the dotted lines adjacent the drum in FIG. 3.) The inner limit of the working depth will then fall between the outer limit and scanner a distance equivalent to the working depth as measured from the outer limit mentioned above. By using the preferred alignment of the lamp filament 16, the document can be reliably scanned as long as it is maintained between the inner and outer limits of the working depth as shown in FIG 3.

Figure 4:
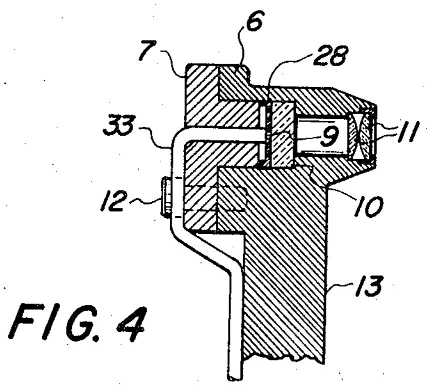
FIG. 4 is a schematic view of a fiber optics system incorporated into the internal assembly.

Since the overall scanner is relatively small and it is desirable to keep the internal assembly small and compact in order that as much light as possible is reflected from the reflector to the document, FIG. 4 shows an alternative embodiment of the scanner wherein a fiber optical bundle 33 is used to carry the reflected light from the scanner to a photosensor located outside the reflector. Because the fiber optics bundle occupies less space than the photosensor, the internal assembly is smaller and more light produced by the lamp reaches the document. FIG. 4 shows the internal assembly adapted to accommodate a fiber optics bundle 33. Frame 6 contains the lens system 11, filter 10 and aperture 28 in the same relationship as described in conjunction with FIG. 2, however, the frame is modified in FIG. 4 to substitute the fiber optics bundle for the photosensor. The frame shown in FIG. 4 is smaller in size than that shown in FIG. 2 since the fiber optical bundle does not need as much space in the frame as the photosensor, and the portion of the optics bundle between the frame and the point at which it exists the reflector can be readily conformed to the shape of the internal assembly, as shown in FIG. 4, thereby taking little room within the reflector.

Figure 5:
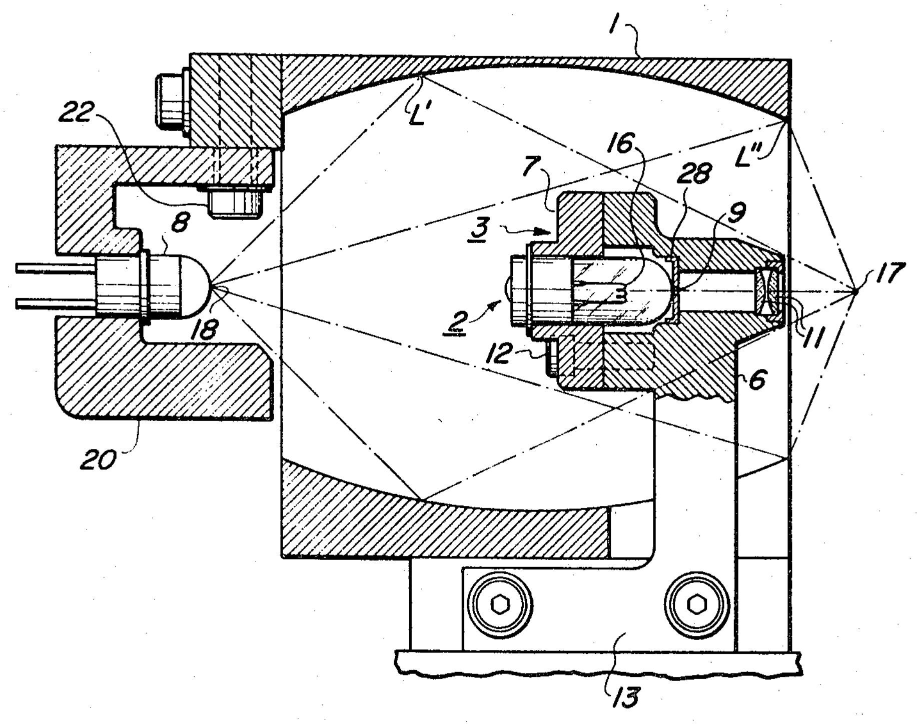
FIG. 5 is a sectional view of the scanner having the photosensor positioned at one focus of the reflector and the light source positioned within the internal assembly.

Another embodiment of the invention is illustrated in FIG. 5. In the scanner shown in this figure the lamp 2 is placed in the internal assembly 3 and the photosensor 8 is positioned at focus point 18 of the reflector. In this arrangement a spot of light generated within the internal assembly by the lamp 2 and aperture 9 is focused on the document (not shown) at focus 17 by lens system 11. The light reflected from the document is reflected by the reflector to the photosensor 8 at focus 18. The signals generated by the photosensor are then transmitted to a receiver as in the embodiment shown in FIG. 2.

In addition to the apparatus outlined above, many other modifications and/or additions to this invention will be readily apparent to those skilled in the art upon reading this disclosure, and these are intended to be encompassed within the spirit of the invention herein.

What is claimed is:

1. A scanning apparatus for scanning documents in fascimile machines and the like comprising:

(a) an elliptical reflector having first and second foci and a major axis, the first focus being located at the surface of the document being scanned;

(b) a lamp having its filament position at the second focus of the reflector whereby light rays from the lamp are reflected by the reflector to the first focus of the reflector;

(c) an internal assembly positioned within the reflector between the two foci and along said major axis including:

(i) means for accumulating and focusing light reflected from the document, and (ii) means adapted for receiving light from said means for accumulating and focusing and generating an electrical signal in response thereto, and (d) means to support the internal assembly within the elliptical reflector.

2. The apparatus in claim 1 wherein the means for receiving light and generating an electrical signal in response thereto is a phototransducer.

3. A scanning apparatus for scanning documents in facsimile machines and the like comprising:

(a) an elliptical reflector having first and second foci and a major axis, the first focus being located at the surface of the document being scanned;

(b) a lamp having a filament with elongated length positioned at the second focus of the reflector, said elongated length being positioned concentrically with said major axis so that approximately equal portions of said length lie on each side of said second focus whereby light rays from the lamp are reflected by the reflector to the document at the first focus and are focused along said major axis on both sides of the first focus;

(c) an internal assembly positioned within the reflector between the two foci and along said major axis including:

(i) means for accumulating and focusing light reflected from the document, and (ii) means adapted for receiving light from said means for accumulating and focusing and generating an electrical signal in response thereto, and (d) means to support the internal assembly within the elliptical reflector.

4. The apparatus in claim 1 wherein the means for accumulating and focusing light is a plate having an aperture located adjacent the light receiving means between the light receiving means and document, and a lens system adapted to focus light on the light receiving means located between the plate and document, said aperture and lens being concentric with said major axis.

5. The apparatus in claim 4 further including a filter means which transmits only light of the required spectral distribution positioned between said aperture and lens system.

6. A scanning apparatus for scanning documents in facsimile machines and the like comprising:

(a) an elliptical reflector having first and second foci and a major axis, the first focus being located at the surface of the document being scanned;

(b) a lamp having its filament positioned at the second focus of the reflector whereby light rays from the lamp are reflected by the reflector to the first focus of the reflector;

(c) an internal assembly positioned within the reflector between the two foci and along said major axis including:

(i) means for accumulating and focusing light reflected from the document, and (ii) means adapted for receiving light from said means for accumulating and focusing and transmitting it to a predetermined location outside the reflector;

(d) means to support the internal assembly within the reflector; and (e) means for generating an electrical signal in response to the light received at said predetermined location outside the reflector.

7. The apparatus in claim 5 wherein the light receiving and transmitting means is a fiber optics system and the means to generate an electrical signal is a phototransducer.

8. A scanning apparatus for scanning documents in facsimile machines and the like comprising:

(a) an elliptical reflector having first and second foci and a major axis, the first focus being located at the surface of the document being scanned;

(b) an internal assembly positioned within the reflector between the foci and along said major axis including:

(i) a lamp, and (ii) means for directing and focusing light generated by the lamp at the first focus, and (c) means to support the internal assembly within the reflector; and (d) means for receiving light reflected by the document and reflector and generating an electrical signal in response thereto.

9. A scanning device of the type wherein the surface of a document or the like is incrementally scanned by a spot of light and reflected light from the document is used to generate electrical signals comprising:

a light reflector of elliptical configuration having an internal surface with light reflecting properties and positioned so that one focal point of the reflector lies in a plane coincident with the surface of a document to be scanned, a light source having an elongated filament positioned at and extending through the other focal point of the reflector whereby light rays emanating from the light source on both sides of the one focal point are reflected by the reflector to points on both sides of the other focal point to thereby provide a range of positions in which the surface to be scanned may lie, and means to accumulate and focus light reflected by the document and to generate an electrical signal in response thereto.

10. A scanning apparatus for scanning documents in facsimile machines and the like comprising:

(a) a reflector of elliptical cross-section having first and second foci and a major axis, the first focus being located at the surface of the document being scanned;

(b) a lamp having its filament positioned at the second focus of the reflector whereby light rays from the lamp are reflected by the reflector, and (c) an assembly positioned along said major axis between the two foci including means to accumulate and focus light reflected by the document and generate an electrical signal in response thereto.

11. The apparatus in claim 10 wherein the reflector is an ellipsoid.

12. The apparatus in claim 10 wherein the major axis of the reflector is substantially normal to that portion of the document being scanned.

References Cited

UNITED STATES PATENTS

| | | | |
|---|---|---|---|
| 1,897,219 | 2/1933 | Schroter | 250—228 |
| 2,086,791 | 7/1937 | Dresler | 250—226 |
| 2,594,122 | 4/1952 | Cashman | 250—226 |
| 2,769,374 | 11/1956 | Sick | 250—221 |
| 2,838,683 | 6/1958 | Munro | 250—227 |
| 3,207,908 | 9/1965 | Murphy | 250—219 |
| 3,255,357 | 6/1966 | Kapany | 250—227 |
| 3,341,710 | 9/1967 | Cade | 250—239 |

WALTER STOLWEIN, Primary Examiner

U.S. Cl. X.R.

250—239, 228